United States Patent Office 2,923,103
Patented Feb. 2, 1960

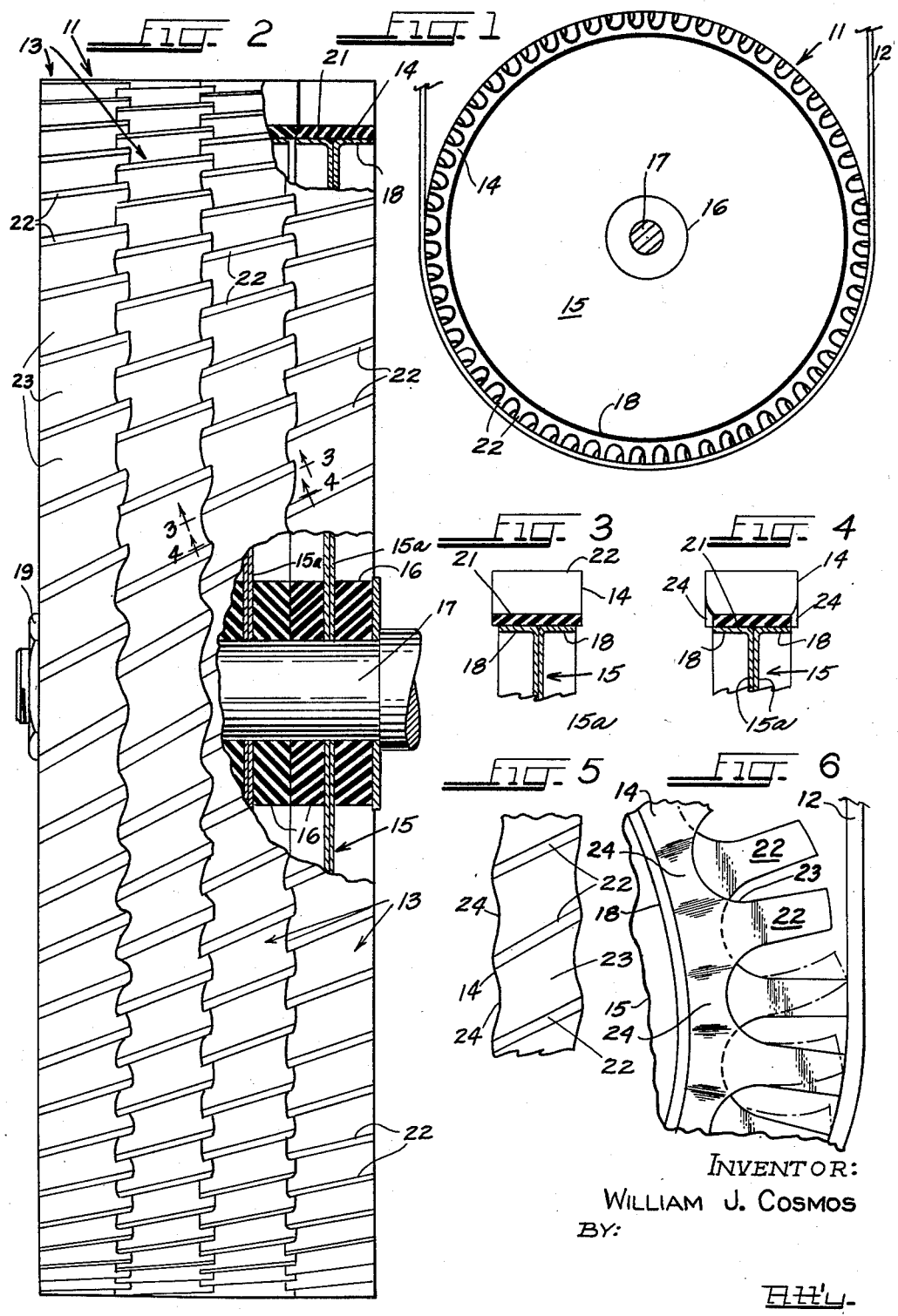

2,923,103

CONTACT WHEEL WITH INTERLOCKING SECTIONS

William J. Cosmos, Waukegan, Ill.

Application June 6, 1957, Serial No. 663,921

4 Claims. (Cl. 51—141)

This invention relates to improvements in high speed contact wheels for grinding and polishing machines employing revolvable coated abrasive belts. In such machines the belt is trained and revolved over one or more such contact wheels and is effectively supported thereby for the presentation of the work thereto, and, at the same time, such wheels afford sufficient resiliency to accommodate variations in the belt and in the work presented thereto, and thereby prevent marring, marking or mutilation of the work.

More specifically, this invention relates to a high speed contact wheel made up of a plurality of wheel units or sections, so combined as to provide a wheel assembly wherein the units are nested together and interlocked one with the other to prevent relative slippage between the wheel units while affording limited resiliency to each unit without minimizing its effectiveness as a backing for the belt trained thereover. The improved wheel unit also includes a novel construction wherein the resilient effective surface or peripheral rim on the unit is bonded firmly to the perimeter of a metal disk, and the disk has a resilient hub portion which affords spacing means between the adjacent wheel units when assembled into a contact wheel. Adequate ventilation for the dissipation of heat generated while in use is afforded by the formation of novel radial peripheral ribs on the effective surface of each wheel unit. Furthermore, the formation of such ribs, and of considerable heighth, on the peripheral surface of each wheel unit affords a structure which can be dressed down repeatedly without destruction of the effectiveness of such ribs.

Contact wheels made of a plurality of wheel units or sections are known in the art, for example, see my United States Letters Patent No. 2,605,592, issued on August 5, 1952. Structures similar to those shown in that patent were found suitable for use in finishing work, especially where only light pressures were applied to the work piece so that only relatively light pressure variations were transmitted to the wheel itself. However, since such sections were connected together mainly at the periphery of the wheel, slippage between the sections resulted. Also, as wheel sections of the known type wore at the periphery in contact with the belt, slippage between sections became more acute. Furthermore, the absence of spacing means around the shaft resulted in inaccurate spacing of the sections and some wobbling when the wheel was placed in motion. It is also important that the periphery of the wheel be resilient, and the prior art structures of the type referred to, when the sections were joined to one another, provided only limited resiliency since the peripheral ribs fully overlapped behind one another.

It will be evident that the present invention avoids the problems of slippage, wobbling and inaccurate spacing mentioned in the preceding paragraph, while providing a contact wheel made of a plurality of disk sections which is sufficiently resilient for all types of grinding and polishing work.

It is therefore an object of this invention to provide a novelly constructed high speed contact wheel.

Another object is to provide a novelly constructed self-cooling contact wheel unit.

A further object of this invention is to provide a wheel unit of the character referred to with novel means in its side faces for interlocking with the opposed faces of adjacent wheel units in an assembled wheel to prevent relative slippage of the units.

It is also the object of this invention to provide a contact wheel of the character referred to with novel means for overlapping the component sections thereof, so as to prevent marring, marking, or mutilation of the work piece.

Still another object of this invention is to provide a wheel unit with a novelly formed resilient hub portion.

With the foregoing and such other objects in view, which will appear as the description proceeds, the invention consists of certain novel features of construction, arrangement and combination of parts hereinafter fully described, illustrated in the accompanying drawings, and particularly pointed out in the appended claims, it being understood that various changes in form, proportion, size and minor details of the structure may be made without departing from the spirit of the invention.

Referring to the drawings in which the same characters of reference are employed to identify corresponding parts:

Figure 1 is a side elevational view of a contact wheel embodying the features of the invention and showing a belt trained thereover.

Figure 2 is an enlarged edge view of the wheel, showing parts broken away to illustrate details of its construction.

Figure 3 is a detail sectional view taken on line 3—3 of Figure 2.

Figure 4 is a detail sectional view taken on line 4—4 of Figure 2.

Figure 5 is a fragmentary peripheral edge view of one of the wheel units.

Figure 6 is an enlarged fragmentary side view of the perimeter of the contact wheel, showing the ribs thereof displaced, in dotted lines, as when in use.

Referring to the accompanying drawings and particularly to Figures 1 and 2, the contact wheel 11 is adapted to have trained thereover a coated abrasive belt 12. The contact wheel 11 is composed of a plurality of wheel units or sections 13, any number of which are combined to provide a wheel of a width that corresponds substantially to the width of the belt 12. In the present disclosure, four (4) such wheel units 13 are nested together face to face, and each comprises a band or tire rim 14 bonded or otherwise secured firmly on the perimeter of a disk assembly 15 having a resilient hub 16 on each face thereof. The wheel units 13 are carried on and may be rotatable with a shaft or spindle 17.

The disk assembly 15 of each wheel unit 13 preferably comprises a pair of sheet metal dishes or discs 15a, each having a peripheral flange 18. The discs 15a are placed in face to face abutment with their flanges 18 extending outwardly away from each other, and each disc has associated with it one of the pair of resilient hubs 16. Each hub has a thickness that is slightly greater than the width of the peripheral flange 18, so that when the wheel units are assembled on the shaft 17 and the mounting nut 19 is tightened, the hubs 16 are compressed so as to secure the wheel units firmly on the shaft and in close association with the other. These resilient hubs 16 may be fabricated from any suitable resiliently compressible material, preferably rubber, and they are adapted to tend to expand in response to absorption of heat generated during wheel operation so as to always insure a tight wobble-free mounting and accurate spacing of the disc assemblies.

The rim 14 on each wheel unit 13 is slightly wider than the combined width of the peripheral flanges 18 of the disc assembly 15 on which it is mounted, and each rim is of unique construction and design. Furthermore, the rims on adjacent wheel units in the wheel assembly are formed, in a manner to be described presently, to cooperate one with the other to prevent relative slippage between the units. The rims 14 also are fashioned on their outer circumferential or effective faces with novel transverse traction ribs, the presence of which provides deep, spaced grooves or channels which allow for ventilation and the dissipation of much of the heat of operation of the wheel.

More specifically, the rim 14 is fabricated from rubber or other resiliently deformable, tough, wear resisting material, and it includes an annular base portion 21 which is bonded to the disc flanges 18. Extending outwardly radially from this base portion is a plurality of mutually spaced substantially laterally extending radial ribs 22, which are parallel to each other, and are disposed at an angle to the axis of the wheel unit. The detailed spacing of the ribs 22 and their width, as well as the specific angle of disposition, is a matter of choice and design, and is determined by the use to which the wheel is to be put. For example: a slight angle is most useful for rough grinding or stock removal, whereas any increase in the angle results in a wheel more useful for finer grinding or polishing. Irrespective of the angle of the ribs or their spacing or thickness, said ribs are separated by like grooves or channels 23, which preferably are semi-circular at their inner or closed ends so as to afford an increased width at the base of each rib to reinforce the latter.

It is usually desirable to maintain a uniform wheel surface pattern without any gathering or grouping of the ribs on adjacent wheel units 13. Such gathering or grouping of the ribs on adjacent wheel units would occur if one or more of the wheel units slipped relative to adjacent wheel units, and as a result of such slippage shadow marks or the like would appear on the belt 12. Also, slippage sometimes results in lateral abutment of the ribs 22 across the working surface of the wheel. Such alignment of the ribs 22 of the wheel units 13 permits the formation of a slight chasm between the abutted ribs, which is accentuated when the wheel is placed in rotation and a work piece is thrust against the belt revolving around the wheel, and shadow marks or the like appear on the belt 12. Such shadow marks are transmitted to the work piece, and result in marking, marring or mutilation of the work. It is therefore essential to retain the wheel units against relative slippage.

Accordingly, the side faces of the base portion 21 of each rim 14 are formed with a series of mutually spaced radial depressions 24 (Figures 4, 5), one in substantial register with each surface groove 23. It has been noted hereinabove that each rim 14 is slightly greater in width than the width of the combined flanges of the disc mounting such rim. When a number of wheel units 13 are mounted in face to face abutment on the shaft, they are so arranged relative to each other that the ribs 22 on one wheel unit are in substantial alignment with the surface grooves 23 on the next adjacent unit and, because of the radial depressions 24 in the side faces of the wheel units, the said ribs on one unit extend into the end areas of the surface grooves between the ribs on the next adjacent unit in an overlapping relationship, as shown in Figure 2.

One result obtained by this interfitting or nesting of the abutted faces of adjacent wheel units is the total absence of any tendency of the units to shift or rotate relative to each other while the contact wheel is in use, even when operating with a high power output for heavy stock removal. Furthermore, the tight interfitting of the resilient rims 14 and the tight abutment of the resiliently yieldable hubs 16 prevent objectionable vibration, noise, chattering and the like.

When the contact wheel is in use, the ribs 22 tend to flex under the circumferential drag of the belt 12 in contact therewith. This flexing is illustrated in Figure 6, where it will be observed that the radial ribs 22 on one wheel unit, and engaged by the belt, are flexed in a direction opposed to the direction of rotation and toward the ribs on the next adjacent wheel unit. Because of the overlapping of the end margins of the ribs, the ribs in one wheel unit will serve as an abutment for the associated ribs on the adjacent wheel unit when the latter ribs are under work pressure, so as to thereby prevent any one rib or group of ribs from flexing excessively. The flexing of the ribs and consequent flexing of the belt also prevents the loading and glazing of the belt surface with material removed from the work piece. Maximum cooling ventilation is also assured by the flexing of the ribs 22, which flexing creates a constant variation in the pressure of atmosphere within the surface grooves 23 between said ribs.

When running at proper speed, the contact wheel moves the belt over the work with maximum efficiency. The edges of the flexed ribs 22 act like a file, the effectiveness being determined by the pressure applied by the work, the degree of abrasiveness of the belt, the angle of the ribs, and the specific material used in fabrication of the rim 14.

Although plain rubber is suggested herein as the material from which the rim 14 and hubs 16 are fabricated, other elastic or resiliently compressible materials may be used, and in wide range of densities for different types of work.

As many possible embodiments may be made in the invention, and as many changes might be made in the embodiment above set forth and described, it is to be understood that all matters hereinbefore set forth or shown in the accompanying drawings are to be interpreted as illustrative and not in a limited sense.

Having thus described the invention, what is claimed as new and desired to be secured by United States Letters Patent is the following:

1. A contact wheel for abrading and polishing machines comprising a plurality of wheel units secured in face to face relation, each comprising a central part composed of a pair of discs having outwardly opposed peripheral flanges, a resiliently yieldable hub part arranged centrally of each disc, a resiliently yieldable rim on said peripheral flanges, said rim having a width greater than the combined width of the flanges so as to normally protrude beyond the edges of said flanges, circumferentially spaced ribs on the outer circumferential face of said rim, said ribs defining mutually spaced channels between them, and the side faces of the rims being sinuously contoured to define mutually spaced radial depressions on said side faces one in register with each channel and of substantially the same width, said wheel units being arranged circumferentially relative to each other so as to align ribs on one unit with the channels on the next adjacent unit and in such manner that the radial depressions on each rim are fully occupied by the related ends of the ribs on the next adjacent rim in abutment therewith.

2. A contact wheel for abrading and polishing machines comprising a central part, a resiliently yieldable rim on said central part, a series of mutually spaced substantially transverse ribs on the outer circumferential surface of said rim and extending inwardly radially over the side faces of the rim, said ribs being of substantially uniform thickness and defining channels between them coextensive with their length, the portions of the channels on the side faces of the rim permitting nesting of a series of units mounted face to face on a common axis with the ribs on one rim offset circumferentially relative to the ribs on an adjacent rim a distance sufficient to locate the ribs on one unit in register with the channels on an adjacent unit so as to permit the radial portions of said ribs to enter into and substantially occupy the wide wall channel portions on an adjacent unit and prevent relative slippage in either direction.

3. A generally disc shaped unit for contact wheels comprising a central part, a resiliently yieldable rim on said central part, a series of mutually spaced substantially transverse ribs on the outer circumferential surface of said rim and extending inwardly radially over the side faces of the rim, said ribs being of substantially uniform thickness and defining channels between them coextensive with their length, the portions of the channels on the side faces of the rims permitting nesting of a series of units mounted face to face on a common axis with the ribs on one rim offset circumferentially relative to the ribs on an adjacent rim a distance sufficient to locate the radial portions of the ribs on one unit in register with the side wall channel portions on an adjacent unit so as to permit said radial rib portions to enter into and substantially occupy the side wall channel portions and prevent relative slippage in either direction.

4. A contact wheel for abrading and polishing machines comprising a plurality of wheel units secured in face to face abutment, each unit comprising a central part, a resiliently yieldable rim on said central part, a series of mutually spaced substantially transverse channels on the outer circumferential face of said rim defining mutually spaced ribs, a series of mutually spaced radially extending recesses on each side face of the rim below and one in register with each channel, said recesses defining protuberances between adjacent recesses one contiguous with each rib, said wheel units being offset circumferentially relative to one another so as to locate the protuberances on one unit snugly nested in the recesses on the next adjacent unit in such manner as to prevent relative slippage in either direction circumferentially.

References Cited in the file of this patent

UNITED STATES PATENTS

| | | |
|---|---|---|
| 431,997 | Ross | July 8, 1890 |
| 2,581,754 | Cosmos | Jan. 8, 1952 |
| 2,643,549 | Whitesell | June 20, 1953 |